United States Patent [19]

Ursprung et al.

[11] 4,279,505
[45] Jul. 21, 1981

[54] METHOD FOR PRINT EXPOSURE CONTROL

[75] Inventors: Karl Ursprung, Niederhasli; Franz Zimmermann, Meggen, both of Switzerland

[73] Assignee: Gretag Aktiengesellschaft, Regensdorf, Switzerland

[21] Appl. No.: 85,736

[22] Filed: Oct. 17, 1979

[30] Foreign Application Priority Data

Oct. 20, 1978 [CH] Switzerland .................. 10875/78

[51] Int. Cl.³ .............................................. G03B 27/73
[52] U.S. Cl. ........................................ 355/77; 355/38; 355/68
[58] Field of Search ................... 355/35–38, 355/67–71, 77, 83, 88

[56] References Cited

U.S. PATENT DOCUMENTS

| 3,944,362 | 3/1976 | Dailey | 355/38 |
| 4,101,217 | 7/1978 | Fergg et al. | 355/38 |
| 4,168,120 | 9/1979 | Freier et al. | 355/38 |
| 4,168,121 | 9/1979 | Freier et al. | 355/38 |

FOREIGN PATENT DOCUMENTS 2535034 2/1977 Fed. Rep. of Germany .

Primary Examiner—L. T. Hix
Assistant Examiner—W. J. Brady
Attorney, Agent, or Firm—Burns, Doane, Swecker & Mathis

[57] ABSTRACT

From color density triplets, obtained by the photoelectric point by point scanning of a negative, there are formed an integral density value, a mean density value and a maximum density parameter which are combined by linear combination to form a basic density correction value which modulates the overall density of copies to be produced from the negative. The negative is subdivided into concentric zones, and the more centrally located zones are given a greater weight than the outer zones when the integral density values and the maximum density parameter are being formed. A threshold value is formed and the negative is checked for areas of density greater than the threshold extending up to the margin, and the density values of image points included in such areas are reduced by a certain fraction. Additionally, there may also be evaluated and utilized the difference between the maximum density value in the outermost zone of the negative and a mean density value for use as distinguishing feature to further correct for the presence of exposures taken by flash, against the sun or taken of snow scenes.

22 Claims, 3 Drawing Figures

METHOD FOR PRINT EXPOSURE CONTROL

BACKGROUND OF THE INVENTION

The invention concerns a method of modulating the exposure of photographic copies where the original to be copied is scanned point by point photoelectrically in order to derive density values for the scanned points and, from the values to derive a basic density correction factor to be used for modulation of the overall density of the copy to be prepared.

Experience has shown that various originals to be copied, usually negatives, although being generally similar in density structure, will often require very dissimilar treatment when being reproduced because of the subject portrayed in the original, namely whether the primary subject (for example one or more persons) is located within the light or dark area of the image.

If a photograph is taken by means of a flash, the important portion of the picture will usually be found within the dense portions of the negative, and will often form its densest portion. For example, in the case of photographs taken of persons the important portion, the face of the subject, will be the more dense portions because the face of such persons is being directly illuminated by the flash. It is important in these circumstances to reproduce the dense portions of the negative in a proper manner when making a copy.

On the other hand, when a street scene is being photographed in a narrow, shady street, the important subject of the picture will usually be located within the shady sections, that is within the areas of low density of the negative, while objects producing a high density of the negative, for example a portion of the sky, by chance visible at the fringe of the picture, are unimportant in this specific case. In order to reproduce properly the area containing the primary subject, a negative portraying a subject such as a street scene must be exposed to a much lesser degree than a photograph of approximately identical overall density but taken by use of a flash. Similar conditions exist in the case of snow scenes, scenes containing extensive sections of sky and exposures taken against the sun. In the case of known exposure control methods, the copies produced from such negatives are usually too dark.

In order to reduce the rate of rejects, already very low due to the presently used automatic copying systems, it is imperative to differentiate the originals to be copied in accordance with their subjects with the aid of suitable criteria and to process these originals in appropriate and diverse manners. There are several proposals known which have a similar aim. However, although these arrangements do improve the quality to a certain degree, they do not solve, or at least only partially solve, the problem discussed above. For example, German Pat. No. 10 42 374 discloses a copying method where the density of the original is scanned point by point in its three primary colors to obtain discrete density values. By weighted approximation of the mean, area densities are acquired from the discrete density values and the area densities are then used to arrive at an optical filter combination for the exposure of the material to be copied, utilizing integral density measurements. The weighted approximation to the mean gives greater weight to the density values obtained from the scanning points of the central area of the original than to the values obtained from the marginal areas of the original. This known method makes use of the empirical fact that the primary subject of the picture will be usually found at its center, and by a suitable selection of the weight-coefficients it is possible to improve the quality of copy to a certain extent. However, this method lacks sufficient sensitivity required to produce satisfactory copies in the above-discussed borderline cases.

It is further known in view of German published applications Nos. 17 72 475 and 21 43 023 to subdivide the image of the original to be copied into one single, or respectively halved, perimeter and a multitude of small partial central areas, to accomplish measurements separately of each individual area of the original and to carry out an exposure classification into well known categories on the basis of the individual test results. In the case of the method proposed by German patent application No. 17 72 475 only two values are used generally for this classification, namely the mean density of the perimeter and the maximum density of the partial central areas. In the case of the German patent application No. 21 43 023 the classification method has been refined by examining the means densities of the two half perimeters separately. Although the percentage of acceptable prints obtained utilizing these two methods is relatively high compared to integral density measurement or the method described in German Pat. No. 17 72 475, they do not meet all the requirements encountered in practice due to the insufficient number of parameters used for the classification.

Published German patent application No. 21 42 176 discloses a method for an exposure control where the density of the original to be copied is checked point by point and where density values which are derived from a specific area of the original are utilized primarily in order to determine the exposure characteristics. The specific areas are selected individually, varying from one specimen to another. The selected area comprises the important and significant area of each picture. The exposure characteristics are obtained by the evaluation of the mean density, the maximum density and the mean contrast between the scanned points of the selected area and, if necessary, the mean density of the entire original to be copied. This copying method makes it possible by a suitable selection of the specific area to be scanned to adjust the exposure of the original in such manner that it will meet all requirements necessary to emphasize correctly the main subject of each original. However, the specific scanning area must be selected visually, and this method is therefore not suitable for an automated system. If, on the other hand, the specific scanning area is fixedly set for all originals to be copied, as proposed in the published German patent application No. 21 42 176, for example, within the central area of the original, it will be possible to avoid a visually performed processing step but the parameters used by this method for the computation of the exposure characteristics will then not suffice in all instances for the production of qualitatively satisfactory copies.

A significant improvement of the exposure modulation, and as a result thereof a substantial reduction in the rate of rejects, is accomplished by a method described in U.S. Pat. No. 4,092,067 where the original to be copied, after point by point scanning, is divided into concentric zones. Intermediate values are derived for each zone from the density values of scanning points located within the zone and from the density value of one reference picture point applicable to all zones, based on specifications which vary for each zone. From these intermediate values there is then derived a final value which has a decisive influence on the setting of the general exposure. This division of the original into several zones and the individual evaluation of the density values within these zones allows a more precise determination of the density distribution within the original to be copied and a more precise exposure of the area containing the main subject.

OBJECTS AND BRIEF SUMMARY OF INVENTION

It has been found that this known method can be improved still further, especially for the processing of originals containing exposures taken against the sun as well as snow and sky scenes.

It is therefore an object of the invention to provide an improved method of the above-defined type for the modulation of exposures in which originals containing subjects which are very difficult to process can be copied with better results.

It is a more specific object of the invention to provide a novel method for modulating the exposure of a photographic print of an original to be copied in such a manner that originals taken against the sun or with considerable snow and/or sky areas are copied with improved results.

Briefly in accordance with the invention, the original to be copied is checked by electronic comparison of the density values of its scanned image points with a threshold value in order to determine whether it contains areas which have image points with a density above the threshold value and which extend to at least one of its margins. If such an area is found, the exposure of the photographic copy is modulated accordingly so that such areas do not have as adverse an influence on the copy. More specifically, when such areas are identified, the density values of at least a portion of the image points associated with such areas are reduced and, in place of the measured density values, the reduced density values are used for at least one portion of the processing steps which lead from the individual density values to a basic density correction factor which is ultimately used to control exposure and thus print content. The overall density of the photographic copy is thus modified in response to the detection of such high density areas extending to the margin of the original.

DETAILED DESCRIPTION

Figure 1:
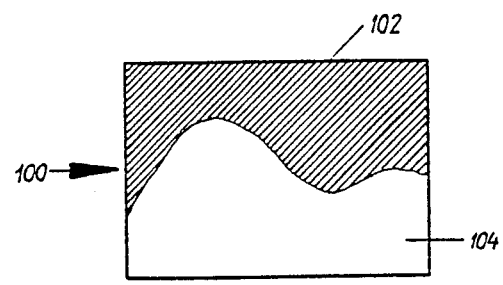
FIG. 1 is a representation of a photographic original, usually a negative; showing areas of high density (shaded) and low density (unshaded)

FIG. 1 illustrates an original to be copied which is usually a negative and which hereinafter will be referred to by this name.

The illustrated negative 100 has areas of high density 102 and areas of low density 104 as might occur when photographing a scene against a bright sky or a subject which is back-lighted by the sun or other bright light source. Thus, FIG. 1 generally illustrates the type of original which, when used to make prints, may result in poor quality prints because of the relatively dense "sky" areas such as at 102.

Figure 2:
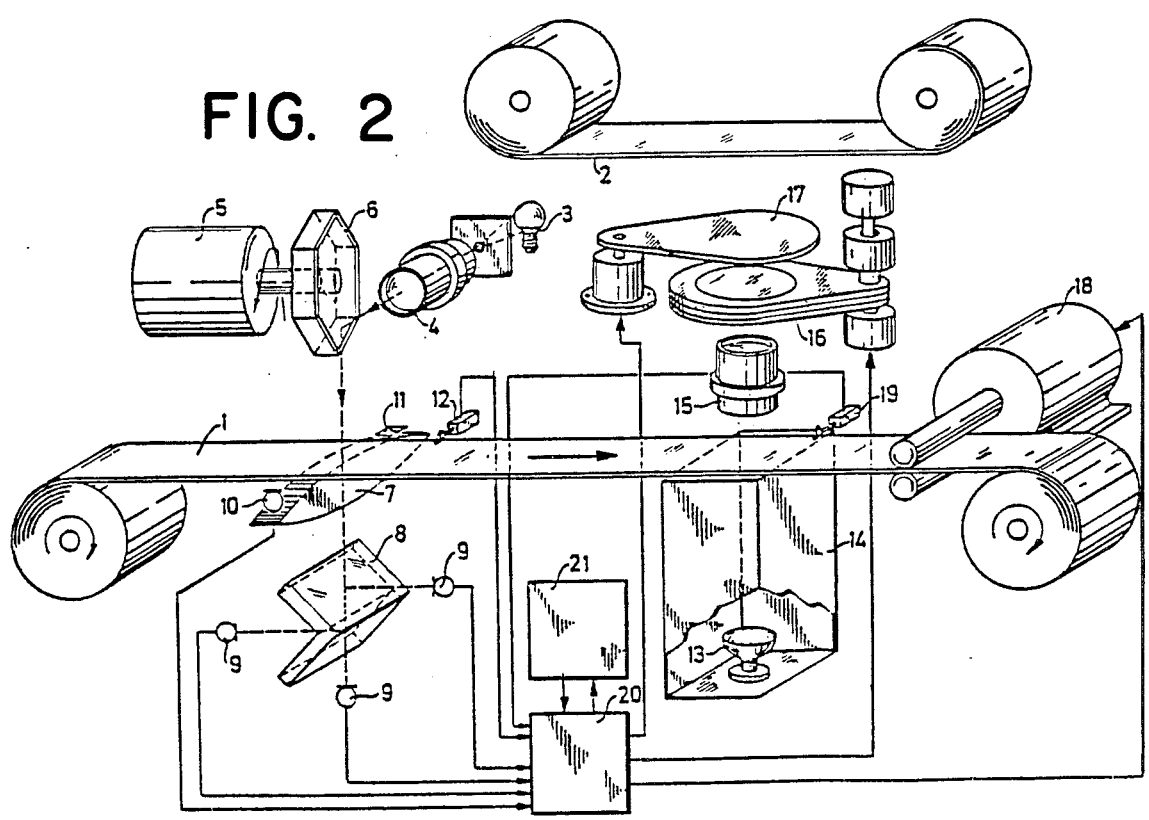
FIG. 2 is a functional block diagram of a prior art system with which the present invention may be employed; and, FIG. 3 is a flow diagram illustrating one embodiment of the method of the present invention as implemented in conjunction with the system of FIG. 2.

The present invention is preferably performed with a point by point scanning technique such as that illustrated in FIG. 2. The system illustrated in FIG. 2 may be identical to that shown in U.S. Pat. No. 4,101,216 except as is explained fully hereinafter. Accordingly, the FIG. 2 system will not be fully described herein.

Referring to FIG. 2, the negative to be copied is scanned point by point photoelectrically within an automatic printer by a scanning system that employs photocells 9 for the three color channels. The light values, picked up by the photoelectric sensors or cells 9, are converted by way of amplifiers, a logarithm former and an A/D converter into digital signals which represent the three color density values of the negative for the individual scanning or image points as described in U.S. Pat. No. 4,101,216. The color density values so obtained are then analyzed in the exposure control of the printer and processed into final exposure data which are used for the control of the color balance and the overall brightness of the copy during the exposure in the printer which follows the scanning operation. The analysis and processing of the measured scanning values is accomplished digitally by a micro- or minocomputer. Up to this point, the method proposed by the invention follows the known state of technology represented, for example, by the automatic printer 3140, produced by the firm GRETAG AG in Regensdorf, Switzerland, or shown by U.S. Pat. Nos. 4,092,067 and 4,101,216.

A significant departure of the method according to the present invention from the present state of the art represented by the foregoing patents is in the processing of the scanned density values in order to form the basic density correction value BDC which has a decisive influence on the overall density of the copy and which will then be further processed in a known manner in order to control the copying filters of the printer.

Figure 3:
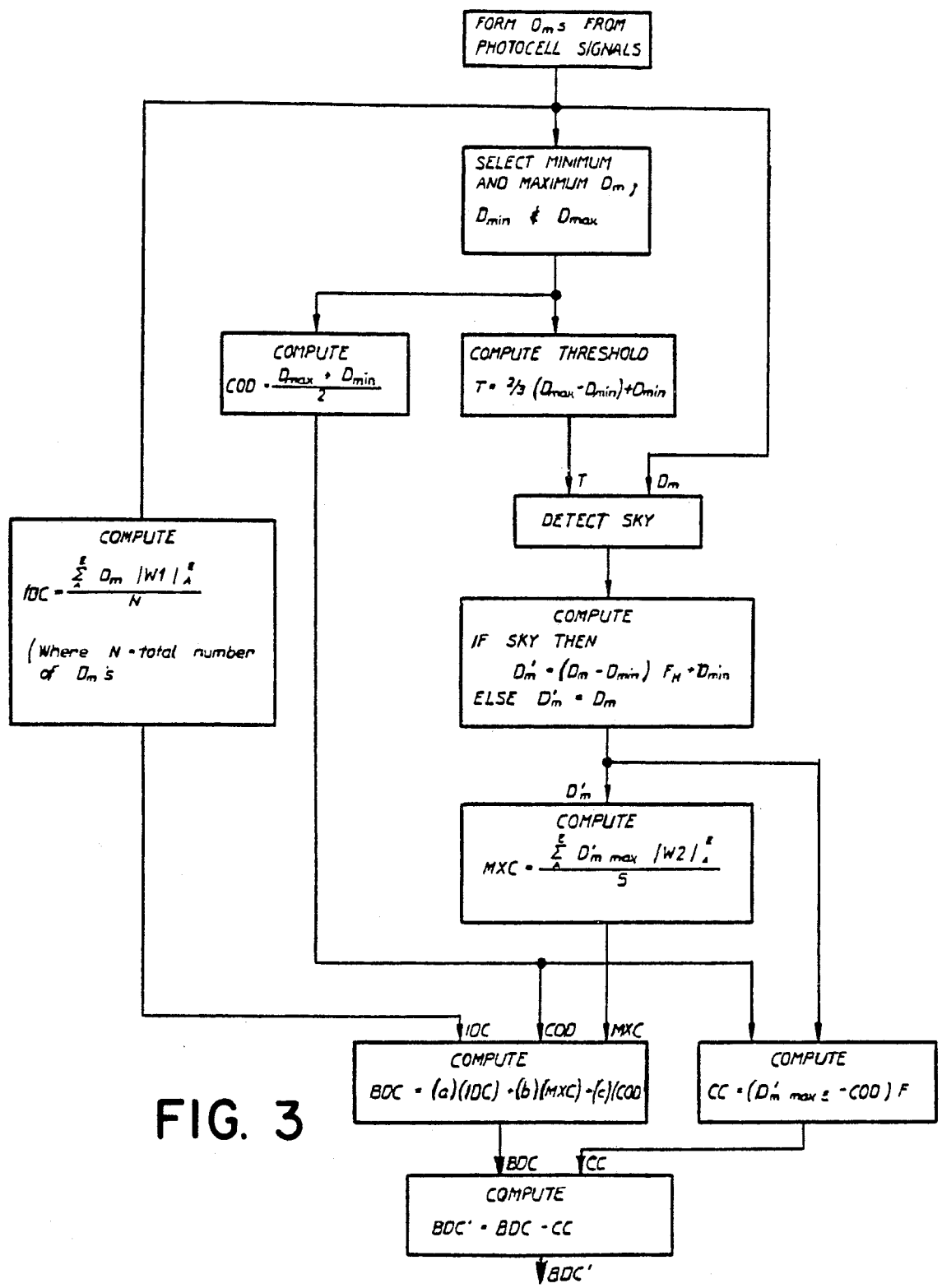

Referring to FIG. 3, it will be appreciated that there is first formed from the three color density values of each image point, for example, by linear combination as described in U.S. Pat. Nos. 4,092,067, a neutral density value $D_m$. The minimum and the maximum neutral density values $D_{min}$ and $D_{max}$ are then determined and are used to form an arithmetic mean $COD=(D_{max}+D_{min})/2$ as well as a threshold value. This threshold value is fixed at a value of approximately $\frac{2}{3}$ of the density interval between the minimum and the maximum density values (that is, $\frac{2}{3}(D_{max}-D_{min})+D_{min}$) but can be moved, if necessary toward the larger or the smaller density values.

The area of the negative is then subdivided into, for example, five concentric zones, (A, B, C, D and E) similar to the arrangement shown by U.S. Pat. No. 4,092,067. An integral density value IDC is then formed from the neutral density values $D_m$ of the individual image points by a weighted zone-related averaging where image points located within the center of the negative ($D_{mA}$) are given greater weight than points close to the margin of the negative ($D_{mB}$, $D_{mC}$, $D_{mD}$, $D_{mE}$). In practice, there is assigned to each zone a first weight factor W1, with the weight factors decreasing in value from the center to the outermost zone, these values being approximately 1.4; 0.8; 0.3; 0.1 and 0. Modifications are feasible and the weight factors can be set within an approximate range of 2.0 to 0. The integral density value IDC so formed contributes, like the mean value COD, to the basic density correction BDC, subsequently determined, and has an equalizing effect on larger areas while still giving greater weight to the center of the negative which should normally contain the main subject.

The negative is then checked to determine whether it contains areas of relatively great density which extend to at least one of its margins. Experience has shown that areas of this type, extending to a margin of the negative, are always present if the negative depicts snow scenes, has been exposed against the sun and/or shows subjects with greater portions of a brilliant sky. If such dense areas are present, it is assumed that the negative contains such scenes or subjects, and a corresponding negative density correction is effected, as explained hereinafter, so that the copy will be brighter and thus better.

In order to detect such dense areas, the density values $D_m$ of the individual image points, arranged for example within a scanning grid of $8 \times 12$ points, are compared with the threshold value successively and always beginning at the negative margin. If one point has a density that is greater than the threshold value and if this holds true for all image points located at the same grid line or column in the direction toward the margin of the negative, it will be considered and flagged as a point which is part of a "sky area". This selection process can be readily accomplished by a person skilled in the art of computer technology without further detailed explanation.

The neutral density values of image points found to be parts of a sky area are then reduced in functional relation to their actual magnitude. This is accomplished by computing, for each neutral density value $D_m$ of each selected image point, a reduced value $D_m'$ by means of the formula $D_m = (D_m' - D_{min}) \cdot F_H + D_{min}$, where $D_{min}$ is the lowest density value found throughout the entire negative, and $F_H$ is a reduction factor within the range of approximately 0 to 0.9, preferably 0.6 to 0.8, and especially 0.75. The reduction of the density values $D_m$ is thus accomplished such that their fraction which exceeds the minimum density value $D_{min}$ is multiplied by a reduction factor $F_H$ smaller than 1.

The maximum density value is now determined for each zone of the negative by taking into account the reduced density values. The several maximum values of the zones are combined by a zone-related weighted averaging where each zone is assigned a second weight factor W2, with the weight factors decreasing from the center toward the outermost zone. These weight factors in the sequence given above can be, for example, 1.26; 1.0; 0.5; 0.2 and 0. In practice, they could and should range from 2.0 to 0. The weighted mean, determined in this manner, forms a maximum density parameter MXC which is primarily applicable to exposures taken with a flash.

The integral density value IDC, the mean value COD and the maximum density parameter MXC are now combined with the standardized factors, a, b and c by linear combination to form the basic density correction value BDC by the formula $BDC = a \cdot IDC + b \cdot MXC + c \cdot COD$ (where $a + b + c = 1$). The fraction factors a, b and c are for example $0.4 \pm 0.4$; $0.2 \pm 0.2$ and $0.4 \pm 0.4$. The basic density correction value BDC computed in this manner can now be further processed to modify the overall density of the copies in a suitable known manner, for example in the manner that the control density D is processed to control illumination in the apparatus disclosed in U.S. Pat. No. 4,092,067.

It has been found that in the case of snow scenes and exposures taken against the sun it may be possible to attain a further improvement if, in accordance with a further aspect of the invention, a complementary correction value CC is superimposed to the basic correction value BDC. This complementary correction value is arrived at by forming the difference between the maximum density value of the outermost zone of the negative which remains after the reduction of the density values (i.e., $D_{m\ max\ E}$, where E is the outermost zone) and the mean value COD and by multiplying the same by a factor F which can range from 0.05 to 0.4, and preferably has a value of approximately 0.15. This supplementary value is now deducted from the basic correction value BDC, resulting in a lesser correction or brighter copy in comparison with the unmodified basic correction value, provided the complementary value is positive, and an opposite type of the correction if the complementary level is negative.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A method of modulating the exposure of photographic copies where the original to be copied is scanned point by point photoelectrically, wherein there is determined the neutral density of each point of the image, and a basic density correction term is derived from the individual density values in order to modulate the overall density of the copy to be prepared, comprising the steps of electronically comparing the density values of image points of the original to be copied with a threshold value in order to determine whether the original to be copied contains areas which extend to at least one of its margins and which contain image points with a density above the threshold value, reducing the density values of at least a portion of the image points associated with such areas, and substituting the reduced density values for the original ones for at least a portion of the processing steps leading to the basic density correction term.

2. The method as defined in claim 1, wherein the threshold value for each original to be copied is determined from the maximum and the minimum density values of that original.

3. The method as defined in claim 2, wherein the threshold value is selected in such manner that it divides the interval between the minimum and the maximum density values at a proportion of approximately 2:1, and that the threshold is closer to the maximum density value.

4. The method as defined in claims 1, 2 or 3 wherein the reduction of the density values is accomplished in a manner that the fraction which exceeds the minimum density value of the original to be copied is multiplied by a reduction factor smaller than 1.

5. The method as defined in claim 4, wherein the reduction factor is selected within a range 0 to 0.9 and preferably from 0.6 to 0.8.

6. The method as defined in claim 4 wherein the original to be copied is subdivided into concentric zones, and an integral density value (IDC) is formed from the density values by a weighted zone-related averaging, where there is assigned to each zone a first weight factor, with the weight factors decreasing in value from the center toward the outermost zone.

7. The method as defined in claim 6 wherein the density values of the individual image points, obtained by photoelectric scanning, are used without reduction for the determination of the integral density value (IDC).

8. The method as defined in claim 6 wherein the first weight factors are selected within a diminishing range from approximately 2.0 to approximately 0.

9. The method as defined in claim 4 wherein the original to be copied is subdivided into concentric zones and there is determined from each zone the maximum density value which remains after the preceding reduction, and there is formed from these maximum density values by zone-related weighted averaging a maximum density parameter (MXC), wherein there is assigned to each zone a second weight factor, the second weight factors decreasing from the center toward the outermost zone.

10. The method as defined in claim 9 wherein the second weight factors are selected within a diminishing range approximately 2.0 to approximately 0.

11. The method as defined in claims 1, 2 or 3, wherein the original to be copied is subdivided into concentric zones, and an integral density value (IDC) is formed from the density values by a weighted zone-related averaging, where there is assigned to each zone a first weight factor, with the weight factors decreasing in value from the center toward the outermost zone.

12. The method as defined in claim 11 wherein the density values of the individual image points, obtained by photoelectric scanning, are used without reduction for the determination of the integral density value (IDC).

13. The method as defined in claim 11 wherein the first weight factors are selected within a diminishing range from approximately 2.0 to approximately 0.

14. The method as defined in claim 11 wherein the original to be copied is subdivided into concentric zones and there is determined from each zone the maximum density value which remains after the preceding reduction, and there is formed from these maximum density values by zone-related weighted averaging a maximum density parameter (MXC), wherein there is assigned to each zone a second weight factor, the second weight factors decreasing from the center toward the outermost zone.

15. The method as defined in claim 14 wherein the second weight factors are selected within a diminishing range approximately 2.0 to approximately 0.

16. The method as defined in claim 14 wherein there is formed from the maximum and the minimum density values of the original to be copied a mean value (COD), the basic density correction term (BDC) being formed by a linear combination of the integral density value IDC, the maximum density parameter MXC and the mean value COD by the formula $BDC = a \cdot IDC + b \cdot MXC + c \cdot COD$ where $a + b + c = 1$.

17. The method as defined in claim 16 wherein the factors a, b and c are selected within a range of $a = 0.4 \pm 0.4$; $b = 0.2 \pm 0.2$ and $c = 0.4 \pm 0.4$.

18. The method as defined in claim 16 wherein there is formed from the difference between the maximum density value, which remains after the reduction of the density values in the outermost zone, and the mean value (COD), and a multiplication factor, an additive complementary correction term for modifying the basic density correction term, thereby controlling the overall density in such manner that there will result therefrom a negative or a positive correction relative to the non-modified basic density correction term if said difference is greater, or respectively smaller than zero.

19. The method as defined in claim 18, wherein the multiplication factor is in the range of 0.05 to 0.4 and preferably has a value of approximately 0.15.

20. The method as defined in claims 1, 2 or 3 wherein the original to be copied is subdivided into concentric zones and there is determined from each zone the maximum density value which remains after the preceding reduction, and there is formed from these maximum density values by zone-related weighted averaging a maximum density parameter (MXC), wherein there is assigned to each zone a second weight factor, the second weight factors decreasing from the center toward the outermost zone.

21. The method as defined in claim 20, wherein the second weight factors are selected within a diminishing range approximately 2.0 to approximately 0.

22. The method of modulating the exposure of photographic copies produced from an original to be printed comprising the steps of:
scanning the original to be printed point by point and deriving a density value for each scanned point in order to derive an exposure correction factor;
comparing at least some of the density values with a threshold value to determine if the density values exceed the threshold value;
detecting the presence of a series of values exceeding the threshold value and extending to at least one of the margins of the negative over at least a predetermined span; and
modulating the exposure of the photographic copy in response to the detection of said area of the negative.

* * * * *